United States Patent [19]

Hirakata et al.

[11] Patent Number: 5,313,293
[45] Date of Patent: May 17, 1994

[54] DOT-MATRIX TYPE DISPLAY DEVICE

[75] Inventors: Jun-ichi Hirakata, Hitachi; Katsumi Kondo, Katsuta; Shuichi Ohara, Hitachi; Masato Isogai, Mito; Satoru Ogihara, Hitachi; Naoki Kikuchi, Mobara, all of Japan

[73] Assignee: Hitachi, Ltd., Tokyo, Japan

[21] Appl. No.: 932,993

[22] Filed: Aug. 20, 1992

[30] Foreign Application Priority Data

Aug. 20, 1991 [JP] Japan ................................ 3-207998

[51] Int. Cl.$^5$ ............................................ G02F 1/1343
[52] U.S. Cl. ............................... 359/54; 359/82; 359/85; 359/88
[58] Field of Search .................. 359/70, 54, 82, 87, 359/88, 85, 102

[56]  References Cited

U.S. PATENT DOCUMENTS

| | | | |
|---|---|---|---|
| 3,954,325 | 5/1976 | Borden | 359/82 |
| 3,966,302 | 6/1976 | Mikoda et al. | 359/82 |
| 4,664,482 | 5/1987 | Kando et al. | 359/90 |
| 4,679,043 | 7/1987 | Morokawa | 359/82 |
| 4,815,825 | 3/1989 | Nakagomi et al. | 359/106 |
| 5,066,105 | 11/1991 | Yoshimoto et al. | 359/55 |

FOREIGN PATENT DOCUMENTS

| | | |
|---|---|---|
| 341702 | 11/1989 | European Pat. Off. . |
| 2426902 | 1/1976 | Fed. Rep. of Germany . |
| 3300264 | 7/1984 | Fed. Rep. of Germany . |
| 60-263120 | 12/1985 | Japan . |

Primary Examiner—William L. Sikes
Assistant Examiner—Huy Mai
Attorney, Agent, or Firm—Antonelli, Terry, Stout & Kraus

[57]  ABSTRACT

A display device, which is adapted for time-division driving and is free from occurrence of crosstalk, includes a pair of substrates which are arranged to be opposite to each other and at least one of which is transparent, electrodes provided respectively on surfaces of the substrates facing each other, and a material which is sandwiched between the electrodes and the light transmitting quantity of which is changed by an electric field applied between the electrodes. The electrodes formed on the surfaces of the substrates facing each other constitute scanning electrodes and signal electrodes which intersect each other to form display portions. The signal electrodes constitutes independent electrodes formed independently of each other in units of display portions. Outside leads of the respective independent electrodes are passed through the substrate provided with the electrodes and are led out to the back surface of the substrate.

16 Claims, 2 Drawing Sheets

DOT-MATRIX TYPE DISPLAY DEVICE

BACKGROUND OF THE INVENTION

1. Field of the Invention

The present invention relates to a dot-matrix type display device capable of performing large-scale display.

2. Description of the Related Art

A display device using field-effect liquid crystal is effective as a large-scale display device. Particularly, a display device of super-twisted nematic (STN) liquid crystal in which a structure having a large twist angle is given to the liquid crystal is known as a display device using a time-division driving characteristic. The principle of time-division driving in the above dot-matrix type display device will be described hereunder. As shown in FIG. 1, the dot-matrix type display device is provided with linear Y electrodes (signal electrodes) formed on a lower electrode substrate (not shown) and linear X electrodes (scanning electrodes) formed on an upper electrode substrate (not shown), so that display of characters, graphics, etc., is performed through an electric field applied to a field-effect liquid crystal sandwiched between the X and Y electrodes. That is, the display is performed by selective turning-on (or turning-off) of the liquid crystal at points of intersection between the X and Y electrodes.

Scanning is sequentially and repeatedly performed on the scanning electrodes $X_1, X_2, \ldots X_n$ in FIG. 1 sequentially line by line to thereby perform timedivision driving. When, for example, the scanning electrode $X_3$ is selected, display signals from the signal electrodes $Y_1, Y_2, \ldots Y_n$ are applied to all pixels $Z_1, Z_2, \ldots Z_n$ on the electrode simultaneously so as to perform selection (or non-selection). Points of intersection can be thus turned on (or turned off) by combinations of voltage pulses applied to the scanning electrodes X and to the signal electrodes Y. In this case, the number of scanning electrodes X corresponds to the number of time divisions (the number of scanning lines or the number of display lines).

The number of display lines is, however, naturally limited due to the characteristic of the liquid crystal. For the purpose of increasing the number of display lines, stripe electrodes (X, Y) may be separated into two groups to form two systems, which makes it possible to increase the number of display lines by twice, as typically shown in FIG. 2. For example, 800 display lines can be provided even in the case of a liquid crystal device having the number of scanning lines limited to 400. It is, however, apparent from FIG. 2 that the signal electrodes Y are connected to external driving circuits 2, 2' and the scanning electrodes X are connected to the external scanning circuits 3, 3' through end portions of the substrate 1. Accordingly, it has been impossible to separate the signal electrodes into three or more groups.

As a measure to solve the aforementioned problem there has been proposed a method of separating the scanning electrodes into three or more groups in which holes are formed so as to substantially perpendicularly pass through the substrate on which the signal electrodes are formed, and in which electrical conductive leads are inserted into the through holes respectively, connected to the signal electrodes and led out to the back surface side of the substrate.

According to the proposed method, the signal electrodes can be separated into a desired number of groups, so that the total number of display lines can be increased. In this method, however, occurrence of irregular display called "crosstalk" cannot be suppressed perfectly. The above "crosstalk" means a phenomenon that the display contrast ratio of the whole display screen is reduced because of occurrence of imperfect turning-on at non-display points (non-selective pixels) not to be displayed. This is a weak point of the dot-matrix display device. When, for example, a certain driving voltage is set, the liquid crystal at non-selection points responds, even through imperfectly, to the driving voltage to increase transmittivity because a bias voltage is applied also to the non-selection points. That is, the difference between the transmittivity in this state and the transmittivity in the case of attaining a perfect non-selection state is called "crosstalk". The crosstalk phenomenon changes depending on the number of time divisions, the electrode resistance and the connection resistance. Generally, crosstalk is apt to occur as the number of time divisions increases, and it becomes large as the sharpness of the threshold characteristics of the voltage and transmittivity becomes low as the electrode resistance and the connection resistance become large.

SUMMARY OF THE INVENTION

An object of the present invention is to provide a dot-matrix type display device which is free from occurrence of crosstalk.

Another object of the present invention is to provide a dot-matrix type display device which is free from occurrence of crosstalk and which is large in the number of display lines.

A further object of the present invention is to provide a dot-matrix type display device which is free from occurrence of crosstalk and which is small-sized.

The subject of the present invention achieving the foregoing objects is as follows.

That is, a dot-matrix type display device including a pair of substrates which are arranged so as to be opposite to each other and at least one of which is transparent, electrodes provided respectively on surfaces of the substrates facing each other, and a material which is sandwiched between the electrodes and the light transmitting amount of which is changed by an electric field applied between the electrodes, and characterized in that: the electrodes formed on the surfaces of the substrates facing each other constitute scanning electrodes and signal electrodes which intersect each other to form display portions; each signal electrode constitutes an independent electrode formed with respect to display portions; and outside leads of the respective independent electrodes are passed through the substrate provided with the electrodes and are led out to the back surface of the substrate.

A method, excellent in mass-production, for forming the outside leads passing through the substrate, includes the steps of forming through holes at predetermined points of the substrate; and filling the through holes with an electrical conductive material. Examples of means for forming the through hole include means of heat melting by use of a laser beam, and means of mechanical perforating, such as drilling, punching or the like. These means may be selected depending on the material of the substrate. A known method, such as screen printing with the use of electrical conductive paste containing a metal such as tin, chemical plating, or the like, may be used as the method of filling the through holes with an electrical conductive material.

The scanning electrodes or signal electrodes may be constituted by two or more electrode groups, whereby the total number of the display lines can be increased. Further, in the display device of the present invention, a driving means (driving circuits necessary for display, such as a scanning circuit, a signal circuit and the like) may be directly mounted on the back surface of the substrate on which the signal electrodes are provided. Furthermore, the signal electrodes may be formed of a metal thin film of aluminum or the like so that they can serve as a reflection film in the display device.

Since the substrate in which the through leads are provided and on which the driving means is mounted is not necessary to be transparent, a ceramic substrate or the like may be used as the substrate. In the case of a ceramic substrate, not only through holes for forming the through leads can be formed easily by mechanical machining in the stage of a green sheet but the resulting substrate can be formed by sintering the green sheet thus perforated.

As the material that the light transmitting amount is changed by an electric field applied between the electrodes, a field-effect liquid crystal is desirable, while also a perpendicular oriented nematic liquid crystal, a capsule liquid crystal, a polymer dispersion liquid crystal, a cholesteric liquid crystal, a ferroelectric liquid crystal, or the like, may be used. Furthermore, an electroluminescent (EL) substance formed of Al quinoline or a self-emitting type field-effect substance such as an inorganic EL substance may be also used similarly.

A liquid crystal composition having anisotropy of a dielectric constant, especially a nematic liquid crystal having positive dielectric anisotropy, may be used as the liquid crystal. It is preferable that an orientation film giving an angle of tilt of 2 degrees or more to molecules of the nematic liquid crystal is provided. An angle of twist in a liquid crystal layer between the opposite, two substrates may be preferably in a range of from 180 degrees to 360 degrees. Dispersion of the liquid crystal in a polymeric material may be also used. The orientation film may be obtained by forming a known orientation film such as polyimide on each of the respective surfaces of the two substrates which are in contact with the liquid crystal. Further, a known means such as rubbing or the like may be used as an orientation control method for the film.

In the display device according to the present invention, the driving means provided on the back surface of the substrate provided with the through leads is connected to an external information processing means or an external information storage means.

Although the invention has been described in the case where the scanning electrodes are provided on the upper substrate and the signal electrodes are provided on the lower substrate, it is a matter of course that the two types of electrodes may be replaced by each other unless the thought of the present invention is changed.

DESCRIPTION OF THE PREFERRED EMBODIMENTS

A dot-matrix type display device of the present invention will be described with reference to the accompanying drawings.

Figure 1:
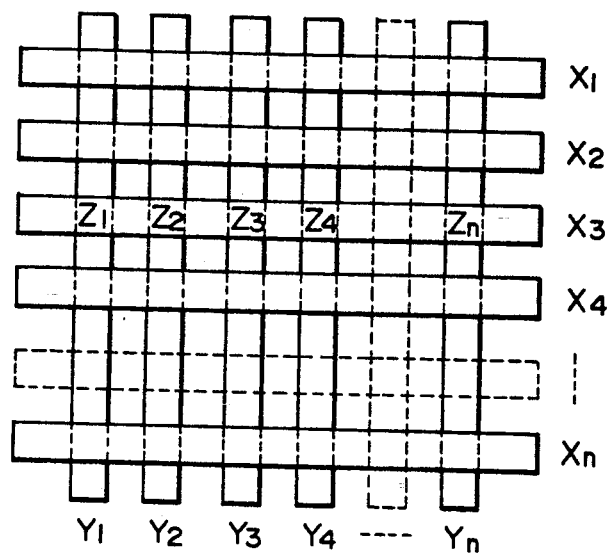
FIG. 1 shows a typical view showing an arrangement of X-Y electrodes in a dot-matrix type display device.
Figure 2:
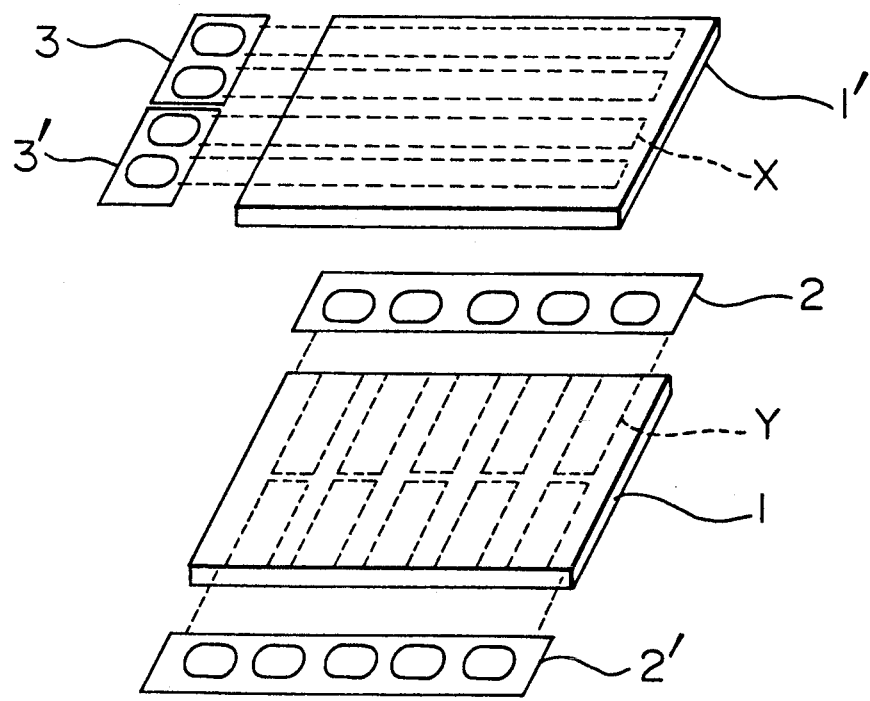
FIG. 2 shows a typical perspective view of a conventional dot-matrix type display device.
Figure 3:
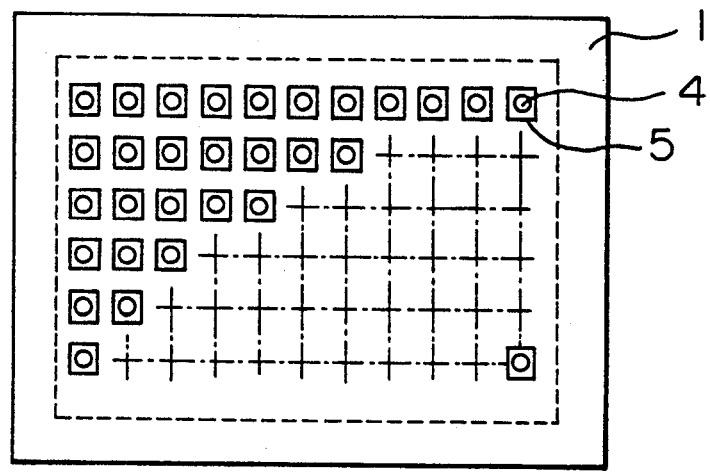
FIG. 3 shows a typical view of the lower substrate in the dot-matrix type display device as an embodiment of the present invention.

FIG. 3 is a view of a lower substrate in the display device as an embodiment of the present invention.

Through holes 4 are formed at display portions, i.e., intersection portions between signal electrodes (Y electrodes) and scanning electrodes (X electrodes) of an upper substrate to apply an electric field to a field-effect material in an area shown in the broken line in the drawing. The formation of the through holes 4 is performed by a laser beam. Then, the through holes are filled with tin as an electrical conductive material. The filling with tin is performed by a known plating method to thereby form electrical conductive leads. Bonding pads for connection to driving circuits are formed on the back surface of the lower substrate. In this case, it is preferable that the through holes are fully filled with the electrical conductive material such as a metal. Although electrical conduction can be obtained by coating the inner walls of the though holes with plating or the like, this method is not preferable because there is a high risk that connection resistance may be increased, or holes may be formed in the signal electrodes on the substrate, or the like.

After the surface of the substrate 1 is polished like a mirror, signal electrodes 5 are formed in a predetermined pattern. The signal electrodes 5 are provided independently in units of display portions as shown in FIG. 3, and it is preferable to form the signal electrodes 5 by a reflective metal such as aluminum so that the signal electrodes 5 can serve as a reflection plate. A polyimide polymer is applied to the electrode forming surface of the substrate by spin coating and is then sintered to be formed into an orientation film, resulting in the lower substrate.

Driving devices for driving the field-effect material are mounted, by tape carrier or the like, on bonding pads for the respective electrical conductive leads on the back surface of the lower substrate.

With respective to the other, upper substrate, a transparent substrate is used and scanning electrodes (X electrodes) are formed on the substrate at predetermined positions so as to intersect between the scanning electrodes and the signal electrodes (Y electrodes). The X electrodes must be transparent ITO electrodes. The formation of the electrodes may be performed by a known method. Note that it is not always necessary that the scanning electrodes must be formed independently in units of dots in the same manner as the signal electrodes.

The dot-matrix type display device according to the present invention is formed by sandwiching the field-effect material between the electrode surfaces of the upper and lower substrates which are arranged so as to be opposite to each other.

In this embodiment, a nematic liquid crystal having positive anisotropy of a dielectric is used as the field-effect material. The angle of twist of the liquid crystal layer is determined based on the direction of rubbing of the upper and lower substrates and the kind and quantity of rotatory polarization material added to the nematic liquid crystal. The angle of twist is limited to 360 degrees as its maximum, because the liquid crystal turned-on in the vicinity of the threshold has the orientation scattering of light. Furthermore, the angle of twist is limited based on contrast to 180 degrees as its minimum.

In this embodiment, the angle of twist is set to 260 degrees to produce a display device capable of monochrome display sufficiently satisfied in contrast even in the case of 200 or more scanning lines. Polyimide orientation film is used to set the angle (of tilt) between the substrate interface and a liquid crystal molecule to 2 degrees or more to thereby attain the aforementioned angle of twist. Therefore, the angle of tilt is set to 4 degrees.

In this embodiment, the thickness of the liquid crystal layer is set to 5.6 μm and a nematic liquid crystal (ZLI-1151 made by Merck & Co. Inc., n=0.1) containing a biphenyl liquid crystal and an ester cyclohexane liquid crystal as main components. As the rotatory polarized material, 0.5% by weight of S811 made by Merck & Co. Inc., and 3% by weight of black dichromatic pigment (S845 made by MITSUITOATSU Chemicals, Inc.) are added thereto.

In this embodiment, G1220DU made by Nitto Denko Industrial Co., Ltd. as a polarizing plate is arranged on the upper substrate. In the viewpoints of contrast, brightness, color and the like, it is preferable that the angle between the polarization axis (or absorption axis) of the polarizing plate and the direction of rubbing of the upper substrate is from 30 to 60 degrees or from 120 to 150 degrees. In this embodiment, this angle is set to 135 degrees. Although this embodiment has shown the case where the polarizing plate is arranged in the outside of the upper substrate, the invention can be applied to the case where it may be arranged between the substrate and the liquid crystal layer. As another structure, an optical compensating plate of a birefringent plastic drawn film of polycarbonate, polyvinyl alcohol or the like may be arranged in the outside (or inside) of the substrate in order to attain monochromatic black and white display.

In this embodiment, for the mounting to respective driving circuits the scanning electrodes are connected at the opposite end portions of the substrate and the signal electrodes are connected through the leads passing through the lower substrate. As a result, a dot-matrix type display device free from occurrence of crosstalk is produced. Furthermore, the weight of the display device can be reduced by about 30% compared with that of the conventional display device.

Why the display device of the present invention is free from occurrence of the crosstalk phenomenon is in that the respective display portions of the signal electrodes are provided as independent electrodes and that the respective electrodes are fed with signals through the leads passing through the substrate, so that any bias voltage or the like is not applied to signal electrodes as non-selection portions. Furthermore., the respective electrodes can be connected to the driving means directly mounted on the back surface of the substrate through the leads passing through the substrate. Accordingly, it is not necessary to use such a frame as conventionally used for connection of the driving means, so that the reduction in size of the display device can be attained.

The case where an alumina substrate is used as the lower substrate will be described now. After an alumina green sheet is perforated by means of punching to form through holes, the green sheet is sintered. The through holes thus formed are filled with a metal by plating. Then, the surface of the sheet is polished and then coated with acrylic resin by use of spin coating. Thereafter, electrodes are formed thereon by ITO sputtering. Except the aforementioned point, the same structure as in the above embodiment is used.

Figure 4:
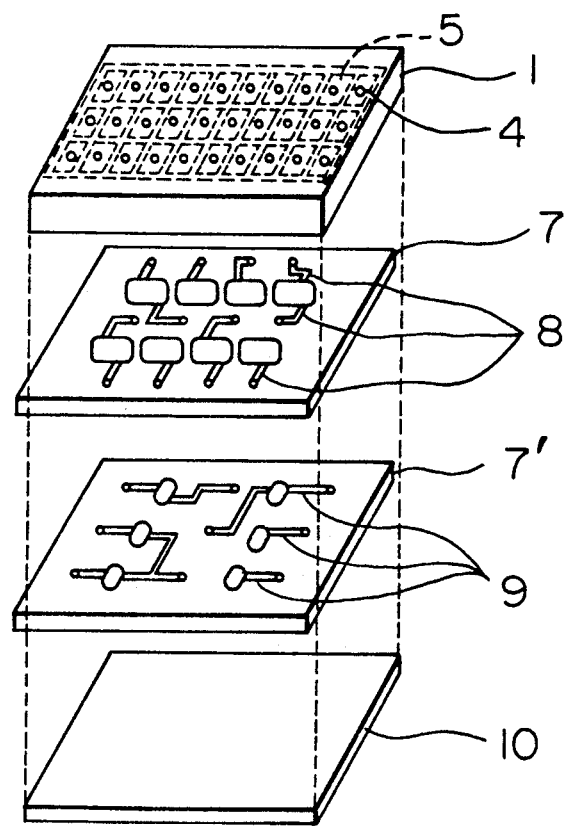
FIG. 4 shows a typical perspective view of the lower substrate in the dot-matrix type display device a another embodiment of the present invention.

FIG. 4 is a typical perspective view showing the structure of a lower substrate provided with a driving section. The substrate 1 is a lower substrate in which a voltage is applied to the liquid crystal layer. The substrate 7 has semiconductor devices 8 for driving signals The substrate 7' has scanning (i.e., external information processing units and external information storage units); and power supply circuits 9. These circuits are connected to one another by using the electrical conductive leads formed in the through holes and using a carrier film. The reference numeral 10 designates an outer casing for the display device. The substrate 1 is formed of alumina. Each of the substrates 7 and 7' is a printed wiring substrate formed of glass epoxy. These are united into one body with a molding resin. A remainder of the configuration is formed in the same manner as in the Embodiment 1.

According to the present invention, a display device which is high in picture quality can be provided because there arises an effect that no crosstalk is generated. Furthermore, driving circuits and the like can be mounted directly on the substrate, so that reduction of the display device both in size and in weight can be attained. The display device can be used in various apparatus such as a lap-top computer, a word processor, a printer, and the like.

What is claimed is:

1. A dot-matrix type display device comprising:
   a first transparent substrate and a second substrate which are arranged to be opposite to each other;
   groups of scanning electrodes and groups of signal electrodes provided respectively on surfaces of said first and second substrates facing each other, one of said scanning electrodes and one of said signal electrodes intersecting each other to define a display portion, each of said signal electrodes being formed independently of other signal electrodes in order to define a different display portion, and said groups of signal electrodes being provided for at least three signal systems;
   a material which is sandwiched between one of said scanning electrodes and one of said signal electrodes, the light transmitting quantity of said material being changed by an electric field applied between said one scanning electrode and said one signal electrode; and
   outside leads from said respective signal electrodes being arranged to pass through said second substrate and to be led out to a back surface of said second substrate.

2. A dot-matrix type display device according to claim 1, wherein said outside leads are formed of an electrical conductive material filled in through holes piercing said second substrate.

3. A dot-matrix type display device according to claim 1, wherein said second substrate provided is constituted by a ceramic substrate.

4. A dot-matrix type display device according to claim 1, wherein said material is a liquid crystal composition having dielectric anisotropy.

5. A dot-matrix type display device according to claim 4, wherein said material is constituted by a nematic liquid crystal having positive dielectric anisotropy, an angle of twist of said nematic liquid crystal being in a range from 180 degrees to 360 degrees, and wherein said display device further comprises an orientation film formed on one of said first and second substrates for giving an angle of tilt of 2 degrees or more to molecules of said nematic liquid crystal.

6. A dot-matrix type display device according to claim 1, wherein said material is constituted of a liquid crystal composition dispersed in an organic polymeric material.

7. A dot-matrix type display device according to claim 1, further comprising a driving unit connected to said outside leads and mounted on said back surface of said second substrate, said driving means being connected to an external information processing unit and to an external information storage unit.

8. A dot-matrix type display device according to claim 1, wherein said signal electrodes serves as a reflection film.

9. A dot-matrix type display device comprising:
a first transparent substrate and a second substrate which are arranged to be opposite to each other;
groups of scanning electrodes and groups of signal electrodes provided respectively on surfaces said first and second substrates facing each other, one of said scanning electrodes are one of said signal electrodes intersecting each other to define a display portion, each of said signal electrodes being formed independently of other signal electrodes for each display portion, and said groups of signal electrodes being provided for at least three signal systems;
a material which is sandwiched between one of said scanning electrodes and one of said signal electrodes, the light transmitting quantity of said material being changed by an electric field applied between said one scanning electrode and said one signal electrode;
a driving unit for driving said groups of signal electrodes of at least three signal systems;
outside leads from said respective signal electrodes being arranged to pass through said second substrate, to be led out to a back surface of said second substrate, and being connected to said driving unit mounted on said back surface of said second substrate.

10. A dot-matrix type display device according to claim 9, wherein said outside leads are formed of an electrical conductive material filled in through holes piercing said second substrate.

11. A dot-matrix type display device according to claim 9, wherein said second substrate is constituted by a ceramic substrate.

12. A dot-matrix type display device according to claim 9, wherein said material is a liquid crystal composition having dielectric anisotropy.

13. A dot-matrix type display device according to claim 12, wherein said material is constituted by a nematic liquid crystal having positive dielectric anisotropy, an angle of twist of said nematic liquid crystal being in a range from 180 degrees to 360 degrees, and wherein said display device further comprises an orientation film formed on one of said first and second substrates for giving an angle of tilt of 2 degrees or more to molecules of said nematic liquid crystal.

14. A dot-matrix type display device according to claim 9, wherein said material is constituted of a liquid crystal composition dispersed in an organic polymeric material.

15. A dot-matrix type display device according to claim 9, wherein said driving unit is connected to an external information processing unit and to an external information storage unit.

16. A dot-matrix type display device according to claim 9, wherein said signal electrodes serves as a reflection film.

* * * * *